Feb. 7, 1956     F. J. TROZMÜLLER     2,734,189
MULTIPLE LUMINOUS INDICATOR
Filed Sept. 11, 1952     2 Sheets-Sheet 1
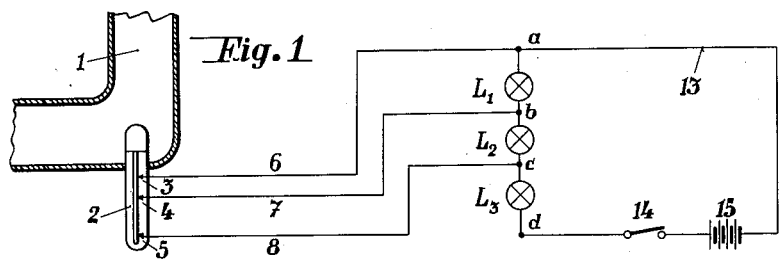
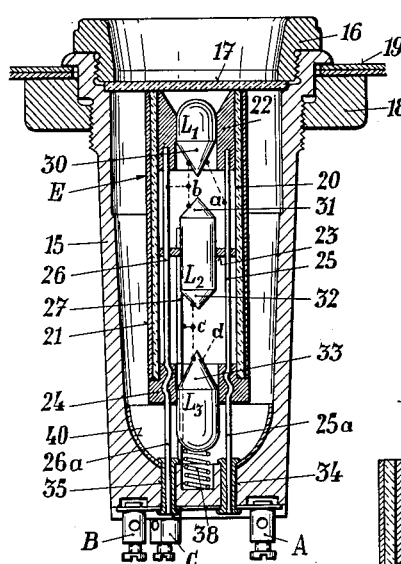
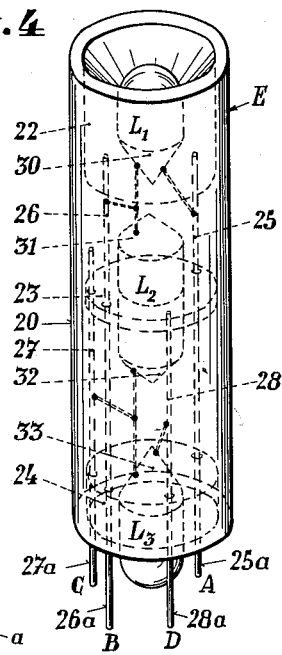
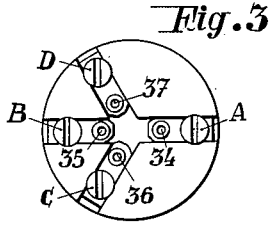
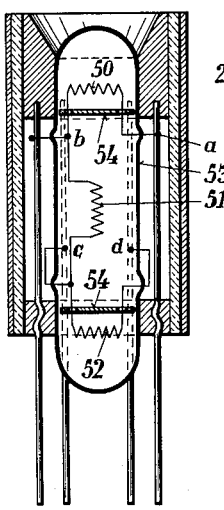
INVENTOR.
FRIEDRICH JOSEF TROZMULLER
BY
ATTORNEY Feb. 7, 1956 F. J. TRÖZMÜLLER 2,734,189
MULTIPLE LUMINOUS INDICATOR
Filed Sept. 11, 1952 2 Sheets-Sheet 2
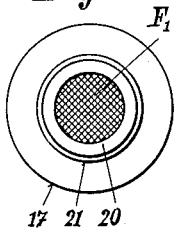
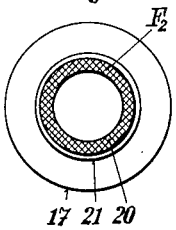
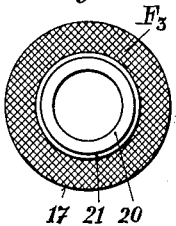
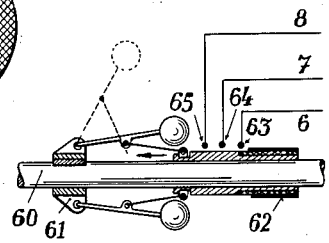
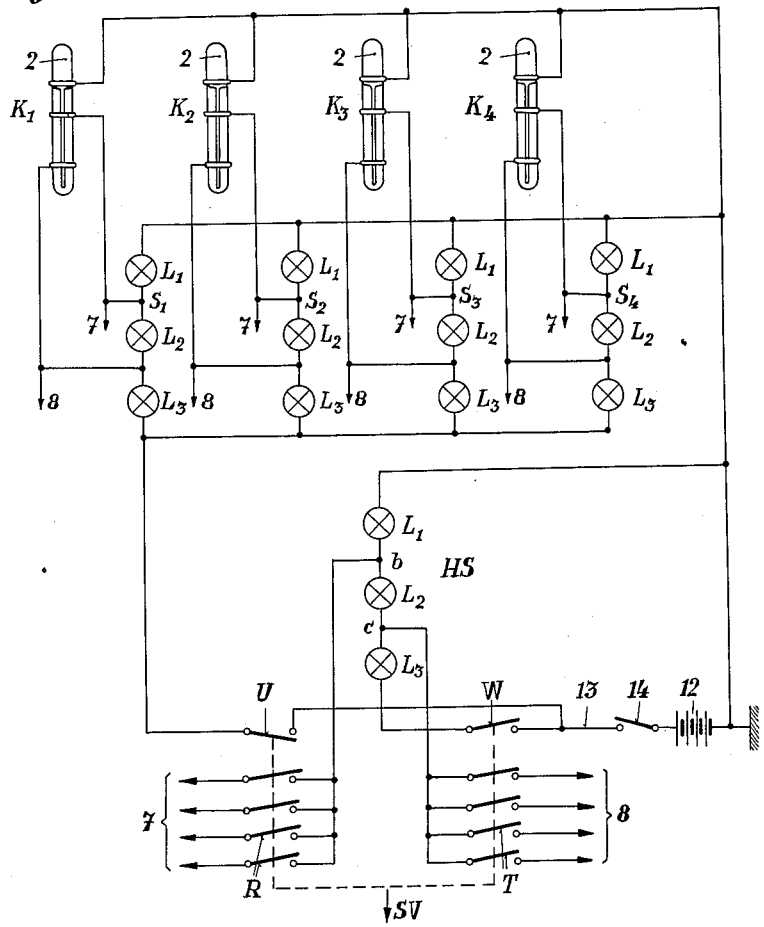
INVENTOR.
FRIEDRICH JOSEF TROSMULLER
BY
ATTORNEY

United States Patent Office 2,734,189
Patented Feb. 7, 1956

2,734,189

MULTIPLE LUMINOUS INDICATOR

Friedrich Josef Trözmüller, Vienna, Austria, assignor to Radio Patents Company of New York State Application September 11, 1952, Serial No. 308,982

4 Claims. (Cl. 340—380)

This invention relates to apparatus for indicating limit values or ranges of a variable and to control devices embodying such apparatus.

For the monitoring of the operating conditions of technical devices it is sufficient in many cases to indicate only limit values or ranges of the variable to be indicated, such as temperature, pressure, speed of rotation, liquid level etc. The invention relates to an indicator of this type, wherein the sensing or measuring element, such as a thermometer, pressure gauge, tachometer, float etc., of the variable to be indicated causes the lighting of a plurality of signal lamps provided for the several indicating values or ranges by means of an electrical contacting device and circuit controlled thereby.

It is an object of the invention to simplify the construction of apparatus of this type and to facilitate the indication and reading of the signals. To this end the invention provides a composite indicator the individual signal lamps of which and/or their supports or holders form a unit constituting the indicating device proper and having an observation window common to all the indicating lamps. Advantageously, the several light signals in the observation window are differentiated by different colours of the light produced by the respective signal lamps.

The invention will be better understood from the following description taken in reference to the accompanying drawings which illustrate, by way of example, a few embodiments of the invention.

In the drawings:

Fig. 1 is a circuit diagram of an indicating device according to the invention designed to indicate discrete temperature values or ranges;

Fig. 2 is a longitudinal cross-sectional view of an embodiment of an indicating device according to Fig. 1, constructed in accordance with the principles of the invention;

Fig. 3 is a rear view of the device of Fig. 2,

Fig. 4 is a perspective view of the unitary lamp unit or inset of Fig. 2,

Fig. 5 shows a modified form of the lamp unit;

Figs. 6 to 8 are various views of the observation window showing the indications corresponding to below-normal, normal and above-normal temperature or other conditions being indicated;

Fig. 9 shows an embodiment of a signalling device according to the invention for indicating different speed ranges of a motor or the like; and Fig. 10 is a circuit diagram of a plural monitoring system using indicators of the type according to the invention.

Referring to Fig. 1 there is shown a circuit for monitoring temperature, such as the engine temperature of an internal combustion engine, comprising a mercury thermometer 2 suitably mounted in the cooling jacket or the coolant duct 1 of the engine. The mercury column of the thermometer 2 cooperates with three contacts 3, 4 and 5, the contact 3 representing by way of example, about 20° C., the contact 4 representing 30° C. and the contact 5 representing 90° C., these values corresponding, by way of example, to the average operating conditions of the conventional motor car engine.

Conductors or leads 6, 7 and 8 connect the contacts 3, 4 and 5 to points $a$, $b$, and $c$, respectively, of an electric circuit 13 including a battery 12, operating switch 14 and the signal lamps $L_1$, $L_2$ and $L_3$ in series, with $a$ representing one terminal of the lamp $L_1$ and $b$ and $c$ representing the junctions between the lamps $L_1$ and $L_2$ and between lamps $L_2$ and $L_3$, respectively. The lamps are selected as to size or type such that the lamp $L_1$ has the lowest wattage, say 1.5 watt according to a practical example, lamp $L_2$ a somewhat higher wattage, say 3 watts, and lamp $L_3$ the highest wattage, say 5 watts.

In the initial or non-operating condition of the engine, the mercury column may represent, for instance, a temperature of 15° C. When the switch 14, which in case of a motor vehicle may be combined with the ignition switch of the engine, is closed, current will flow through all three lamps $L_1$, $L_2$ and $L_3$ in series. Owing to the relatively low wattage of lamp $L_1$ compared with the wattage of lamps $L_2$ and $L_3$, only the lamp $L_1$ will light up, while the lamps $L_2$ and $L_3$ remain extinguished or show only a dim glow.

If now the engine is started, the temperature of the coolant rises during the warm-up period, thus increasing the length of the mercury column of the thermometer 2. When the column engages the contact 3, at first nothing will happen to the lamps or signals and when the contact 4 is reached, corresponding to the lower limit of the normal operating temperature range, that is, 30° C. according to the above example, the lamp $L_3$ will be shunted by the conductors 6 and 7, whereby this lamp will be extinguished. Of the two remaining lamps only the lamp $L_2$ with the relatively lower wattage will now be lit indicating the normal or safe operating temperature range.

If the temperature column rises further to the contact 5, which corresponds to the upper limit of the normal or safe operating temperature range, that is 90° C. according to the above example, the lamp $L_2$ will also be shunted by the conductors 7, 8, so that lamp $L_3$ will now be lit, thus giving a warning signal and indicating that the safe operating temperature of the engine has been exceeded.

If the temperature changes are in the reverse direction, that is, as a result of decreasing engine temperature, the lamps will light up in reverse order, thus indicating the proper operating conditions with both rising and falling temperature.

According to the invention, the signal lamps and their holders are structurally combined in a single unit in the manner more clearly shown by Figs. 2 to 4. In the latter numeral 15 designates a cylindrical housing consisting of insulating material, such as a suitable plastic, and having a top covered by a glass plate 17 forming an observation window and secured to the housing by a screw-threaded mounting ring 16. The housing 15 may, in turn, be mounted, such as by means of a screw-threaded clamping ring 18, or the like, in a corresponding aperture of the dashboard 19 of a motor vehicle.

Arranged with the housing 15 are the signal lamps $L_1$, $L_2$ and $L_3$ in the form of single unit or inset exchangeably mounted in the housing. According to Figs. 2 and 4, this lamp unit or inset collectively denoted by the letter E consists essentially of a glass tube 20 or the like shielded from the outside in a light-tight manner such as by an opaque envelope 21. In Fig. 4 this envelope is omitted for clarity of illustration. Inside the tube 20 the lamps $L_1$, $L_2$ and $L_3$ are mounted or supported by means of suitable adaptors 22, 23, 24, respectively, of insulating material, in such a manner that the lamps $L_1$ and $L_3$ are disposed at the ends of the tube and may radiate freely outwardly from these ends, whereas the lamp $L_2$ is arranged completely within the tube 20.

The adaptors 22, 23, 24, further serve to support lead wires 25, 26, 27, 28 (see Fig. 4) which are connected electrically to the lamps or terminals thereof in any suitable manner. Thus, the lead 25 is shown connected to the terminal 30 of the lamp $L_1$, corresponding to point $a$ in the circuit diagram of Fig. 1, the lead 26 is connected to the junction between the terminals 30 and 31 of lamps $L_1$ and $L_2$, respectively, corresponding to point $b$ in the diagram of Fig. 1, the lead 27 is connected to the junction between the terminals 32 and 33 of the lamps $L_2$ and $L_3$, respectively, corresponding to point $c$ in the diagram of Fig. 1, while the lead 28 is connected to the terminal 33 of the lamp $L_3$, corresponding to point $d$ in the diagram of Fig. 1. The lamps $L_1$ and $L_3$ preferably consist of incandescent bulbs having adjacent pairs of terminals 30 or 33, while the lamp $L_2$ is a tubular lamp provided with opposite terminals 31, 32, respectively.

The lead wires 25–28 extend downwardly from the lamp unit and through the adaptor 24, the protruding ends forming prongs that may be plugged into sockets 34–37, respectively, Fig. 3, mounted in the bottom of the housing 15.

The lamp unit E is thus exchangeably mounted in the lamp socket and is furthermore held and resiliently supported between the glass plate 17 and a coil spring 38 engaging the end of lamp $L_3$. In order to exchange a lamp unit, such as when one of the lamps has become defective, it is sufficient to remove the glass plate 17 by unscrewing the ring 16, to remove the unit E, insert a new unit and to replace the glass disc 17.

The lamp $L_1$ which indicates a temperature condition below the safe operating range, that is below 30° C. in the example given, irradiates directly the window 17 to produce an inner circular central luminous indicating field $F_1$, Fig. 6. By suitably colouring the lamp $L_1$, this signal field can be given a desired colour, such as blue, indicating the subnormal temperature range or condition.

The lamp $L_2$ which serves to indicate the normal operating temperature range, irradiates the inside of the glass tube 20, whereby to light, by guiding or conducting the light rays lengthwise through the tube 20, the edge or end face of the tube adjoining the window 17, preferably in a different colour, such as green, to produce an intermediate annular luminous indicating field $F_2$, Fig. 7, indicating the normal or safe operating temperature range or condition, that is, between 30° and 90°, according to the above example.

The lamp $L_3$ which indicates the rise of the temperature beyond the safe upper limit, that is 90° C. according to the above example, radiates light downwardly towards a reflector 40 arranged on the inside or bottom of the housing, to guide the light emitted by this lamp towards the outer zone of the window 17 and to produce an outer ring-shaped signal field $F_3$, Fig. 8. By colouring the bulb of lamp $L_3$ and/or the reflector 40 or the associated part of the glass plate 17 in still another colour, such as red, a warning signal is thus given to the driver or operator apprising him of the temperature having exceeded the safe operation range of the engine.

In operation, assuming a cold engine, if the circuit 13 of the battery 12 is closed by the switch 14, the blue inner field $F_1$ is lit by the lamp $L_1$, indicating the below-normal temperature condition. As the mercury column reaches the contact 4 during the warm-up period, the field $F_1$ is extinguished and replaced by the green annular field $F_2$ lit by the lamp $L_2$ and indicating the normal operating conditions. As the mercury column reaches the contact 5, the red outer annular field $F_3$ will light up giving a warning that the safe operating range has been exceeded. Practice has shown that this type of temperature indication is fully sufficient for practical purposes for the indication of the operating conditions of a motor vehicle or the like such as engine temperature, oil pressure, speed etc.

It is obvious that other colour combinations may be used for the various luminous signals to suit special conditions or requirements. It is furthermore possible to use a different number of signal lamps or signal fields and to change the shape of the viewing fields from circular to any other configuration.

According to an improved feature of the invention, the multiple lamp unit may be simplified by mounting the filaments 50, 51, 52 of the light sources in a common glass bulb 53, and by shielding the respective light rays by suitable screening elements, such as metal discs 54 or the like, as shown in Fig. 5. It is furthermore possible to provide additional shielding elements inside or outside the bulb 53, such as in the form of cylindrical screens, light impervious coatings, or the like, to effect a separating of the respective light beams.

Evidently the signalling device described hereinbefore may be used to indicate values or ranges of variables other than temperature, such as pressure, speed, liquid level etc. All that is required in such a case is a measuring or sensing element adapted to respond to the variable concerned and an electric contacting device and circuit controlled thereby, to light different signal lamps in the manner described.

Fig. 9 shows a device of this type for indicating rotary speed values. In this case the contact thermometer according to Fig. 1 is replaced by centrifugal speedometer 61 mounted upon a rotating shaft 60 and carrying a sliding contact 62 arranged to co-operate with fixed contacts 63, 64 and 65 corresponding to the contacts 3, 4 and 5 of the thermometer 2 in Fig. 1. The contacts 63, 64, 65 are connected to the shunt circuits 6, 7 and 8 and the operation in indicating subnormal, normal and above-normal engine speed is substantially the same as shown and understood from Fig. 1.

The indicating device according to the invention may furthermore be used for the monitoring of several measuring devices located at different control points. Fig. 10 shows, by way of example, a circuit diagram of a system of this type for indicating the temperature at four different control points $K_1$ to $K_4$. At each of the control points there is provided a contact thermometer 2 which cooperate with signalling devices $S_1$ to $S_4$, each having three signal lamps $L_1$, $L_2$ and $L_3$ in the manner shown in Fig. 1. The signalling lamps are energized in parallel by the battery 12. There is further provided a master signalling device HS similar to the devices $S_1$, $S_2$ and $S_3$ together with a switching device SV, the latter enabling the simultaneous application of the shunt leads 7, 8 of the thermometers 2 to the master signalling HS device, that is, to the junction points $b$ and $c$ of the lamps of the master signalling device. In this position, the master signalling device HS indicates the temperature of all the thermometers at points $K_1$ to $K_4$. For this purpose the switching device SV is provided with switches R and T for each of the shunt leads 7 and 8 respectively, by means of which the connection between the shunts and the points $b$, $c$ of the master signalling device HS may be interrupted, and with switches U and W which may be operated alternately to connect the supply lead 3 from the battery 12 either to the individual signalling devices $S_1$ to $S_4$ or to the main signalling device HS, respectively. The switches R, T, U, W are operated simultaneously and may be in the form of a multiple rotary switch or the like.

Ordinarily the switching device SV is in the position in which the master signalling device HS is connected to the battery 12 and to the thermometer 2. When the upper temperature limit is exceeded at any of the control points $K_1$ to $K_4$, this will be indicated by the master signalling device by lighting of lamp $L_3$ or its red outer signalling field $F_3$. To determine at which control point the temperature limit has been exceeded, the device is switched to the position shown in Fig. 10, to indicate the respective control point indicated by the signalling devices $S_1$ to $S_4$, respectively, since in this case the corresponding device will then respond, that is, light the lamp $L_3$ or signal field $F_3$ in the example assumed. In this manner it is possible to monitor excess temperature or other operating conditions at a large number of separate control points by observing a single indicator, thus greatly increasing the safety and ease of the indication and/or control.

In the foregoing, the invention has been described with reference to a specific illustrative device. It will be evident, however, that variations and modifications, as well as the substitution of equivalent elements for those shown may be made without departing from the scope of the invention as set forth in the appended claims.

I claim:

1. An indicator comprising a viewing screen, a hollow member of light conducting material arranged with one end adjoining said screen, a first light source within said member to irradiate said screen directly and to produce a first central luminous indicating field thereon defined by the inside area enclosed by said member, and a further light source arranged to conduct light through said member to produce a second luminous indicating field defined by the cross-section of said member and encircling said first indicating field upon said screen.

2. An indicator comprising a viewing screen, a tubular member of light conducting material defining an annular light path and arranged at right angle to and adjoining said screen, a first light source within said member to irradiate said screen directly and to produce a first circular luminous indicating field thereon defined by the inside diameter of said member, a second light source arranged to conduct light longitudinally through said member, to produce a further annular luminous indicating field defined by the cross-section of said member and encircling and concentric to said first field upon said screen, and means to produce different spectral colors of said first and second luminous fields.

3. An indicator comprising a viewing screen, a tubular member of light conducting material defining an annular light path and arranged at right angle to and adjoining said screen, a first light source within said member to irradiate said screen directly and to produce a first circular luminous indicating field thereon defined by the inside diameter of said member, a second light source arranged to conduct light longitudinally through said member to produce a second annular luminous indicating field defined by the cross-section of said member and encircling and concentric to said first indicating field, means to provide a further annular light conducting path adjoining and concentric to said first light conducting path, a third light source arranged to conduct light through said third light path, to produce a third luminous indicating field encircling and concentric to said first and second illuminating fields upon said screen, and means to produce different spectral colors of said luminous indicating fields.

4. An indicator comprising a viewing screen, a tubular member of light conducting material defining an annular light path and arranged at right angle to and adjoining said screen, a first light source within said member to irradiate said screen directly to produce a first circular luminous indicating field thereon defined by the inside diameter of said member, a second light source arranged to conduct light longitudinally through said member to produce a second annular luminous indicating field defined by the cross-section of said member and encircling and concentric to said first indicating field, means to provide a third annular light conducting path adjoining and concentric to said first light path, a third light source arranged to conduct light through said third light path to produce a third annular luminous indicating field encircling and concentric to said first and second indicating fields, means to substantially prevent mutual interference between the light beams transmitted by said sources through said respective light paths, and means to produce different spectral colors of said luminous indicating fields.

References Cited in the file of this patent

UNITED STATES PATENTS

| Number | Name | Date |
|---|---|---|
| 1,223,459 | Whitney | Apr. 24, 1917 |
| 2,096,190 | Moeller | Oct. 19, 1937 |
| 2,238,071 | Nazar | Apr. 15, 1941 |
| 2,305,185 | Merkel | Dec. 15, 1942 |
| 2,362,021 | Nazar | Nov. 7, 1944 |
| 2,374,408 | Braidwood | Apr. 24, 1945 |
| 2,402,312 | Burch | June 18, 1946 |
| 2,450,399 | Sheidler | Sept. 28, 1948 |
| 2,599,361 | Beal | June 3, 1952 |